(12) United States Patent
Wang

(10) Patent No.: US 8,411,607 B2
(45) Date of Patent: Apr. 2, 2013

(54) WIRELESS ACCESS POINT AND METHOD FOR SAVING POWER CONSUMPTION OF THE WIRELESS ACCESS POINT

(75) Inventor: Pei-Yu Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 225 days.

(21) Appl. No.: 12/908,155

(22) Filed: Oct. 20, 2010

(65) Prior Publication Data

US 2012/0039225 A1  Feb. 16, 2012

(30) Foreign Application Priority Data

Aug. 11, 2010  (CN) .......................... 2010 1 0250953

(51) Int. Cl.
*G08C 17/00* (2006.01)
*H04B 1/16* (2006.01)

(52) U.S. Cl. ...................... 370/311; 370/467; 455/343.2; 455/343.5

(58) Field of Classification Search .................. 370/310, 370/311, 464–468; 455/343.1–343.6
See application file for complete search history.

(56) References Cited

U.S. PATENT DOCUMENTS

| 7,551,568 B2* | 6/2009 | Jeong et al. ................... 370/311 |
| 2007/0286630 A1* | 12/2007 | Watanabe et al. ............... 399/88 |
| 2008/0013504 A1* | 1/2008 | Nishibayashi et al. ....... 370/338 |

* cited by examiner

*Primary Examiner* — Kerri Rose
(74) *Attorney, Agent, or Firm* — Altis Law Group, Inc.

(57) ABSTRACT

A wireless access point (WAP) includes a radio frequency (RF) module, an identifying module, and a controlling module. The RF module is configured for sending and receiving a wireless signal. The identifying module is configured for identifying whether or not the wireless signal matches the frame format of the PCLP sub-layer of the IEEE 802.11 standards, thereby generating an identifying result. The controlling module is configured for controlling the WAP to switch itself to a power-saving mode (PSM) or a constantly awake mode (CAM), according to the identifying result from the identifying module, wherein in the PSM, under the control of the controlling module, the WAP only receives the wireless signal.

16 Claims, 2 Drawing Sheets

WIRELESS ACCESS POINT AND METHOD FOR SAVING POWER CONSUMPTION OF THE WIRELESS ACCESS POINT

BACKGROUND

1. Technical Field

The present disclosure relates to communication technology and, particularly, to a wireless access point and a method for saving power consumption thereof.

2. Description of Related Art

In computer networking, a wireless access point (WAP) is a device that relays data between wireless devices (such as computers) and wired devices (such as a router) on the network, allowing the wireless devices to connect to the Internet. The WAP generally complies with IEEE 802.11 standards. Conventionally, when no wireless device connects to the Internet through the WAP, the wired device will automatically switch into a power-saving mode (PSM). However, the WAP maintains a constant awake mode (CAM), which leads to a waste of power.

Therefore, it is desirable to provide a new WAP and a method for saving power consumption thereof, which can overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
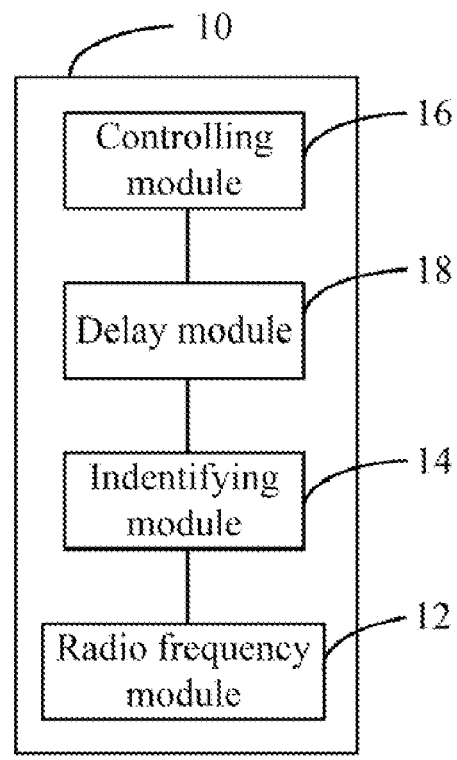
FIG. 1 is a functional block diagram of a wireless access point, in accordance with an exemplary embodiment.
Figure 2:
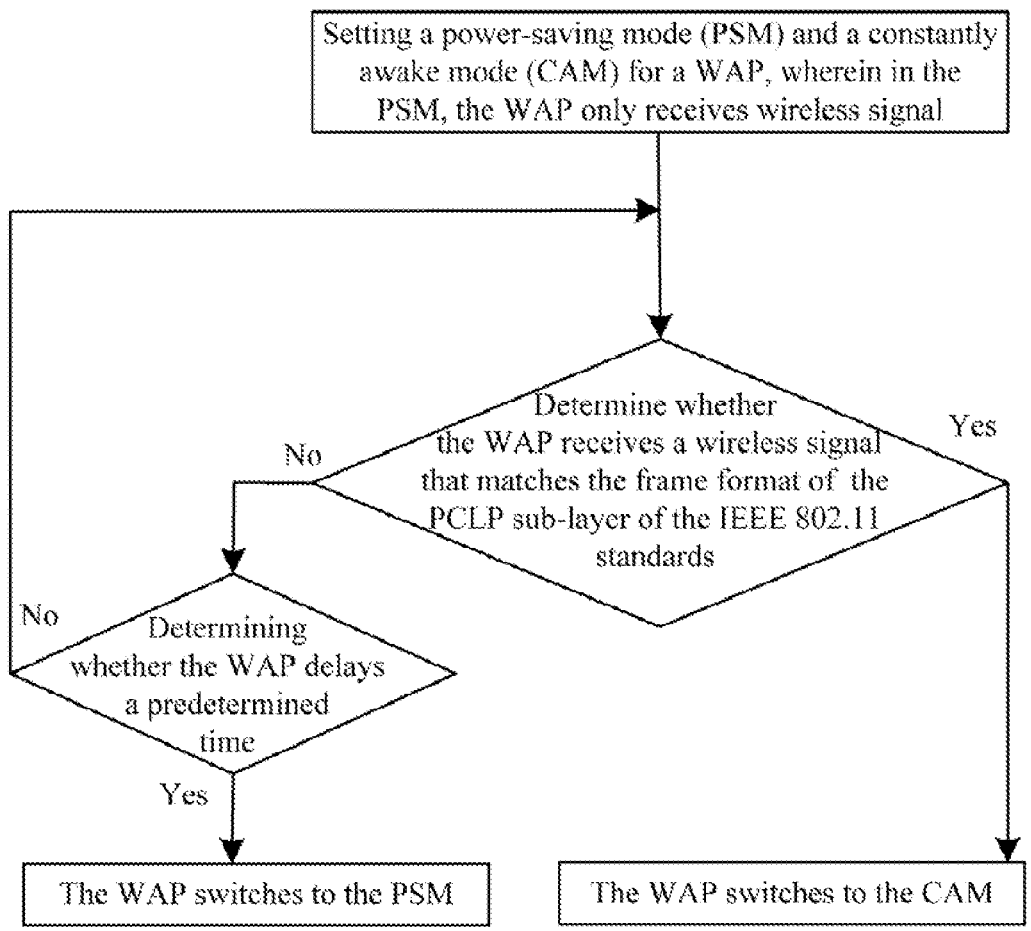
FIG. 2 is a flow chart of a method for saving power consumption of a wireless access point, in accordance with an exemplary embodiment.

Referring to FIGS. 1 and 2, a wireless access point (WAP) 10, according to an exemplary embodiment, includes a radio frequency (RF) module 12, an identifying module 14 and a controlling module 16.

The RF module 12 is used for sending and receiving wireless signal (i.e., radio frequency signals). According to the IEEE 802.11 standards, frequency of the wireless signal should be about 2.4 GHz (the wireless signals complying with IEEE 802.11b, IEEE 802.11g, IEEE 802.11g/n standards) or about 5 GHz (the wireless signals complying with IEEE 802.11a, IEEE 802.11a/n standards). Therefore, the RF module 12 is only sensitive to wireless signal of about 2.4 GHz or about 5 GHz frequency. The RF module 12 transmits the wireless signal received thereby to the identifying module 14.

A media access controller layer (MAC layer) and a physical layer are defined in the IEEE 802.11 standards. The physical layer comprises of a managing sub-layer, a physical layer convergence protocol (PLCP) sub-layer, and a physical medium dependent (PMD) sub-layer. The managing sublayer manages the physical layer. The PLCP sub-layer is used to transform the format of data, so that the data can be transmitted between the MAC layer and the PMD sub-layer. The PMD sub-layer lies below the PLCD sub-layer, dealing with the wireless signal. The PMD sub-layer is configured for modulating and demodulating the data so that the data can be sent or received wirelessly.

The identifying module 14 is connected to the RF module 12, and configured for identifying whether the RF module 12 receives a wireless signal that matches the frame format of the PCLP sub-layer of IEEE 802.11 standards, thereby generating a result. In detail, the identifying module 14 is a chip having a baseband processor which processes data in the physical layer of IEEE 802.11 standards. The identifying module 14 demodulates the wireless signal received by RF module 12 according to the PMD sub-layer standard, and generates a demodulated data. If the wireless signal received by RF module 12 matches the IEEE 802.11 standards, the identifying module 14 will pack the modulated data based on the PCLP sub-layer standard, generating a packet data. The packet data has a frame format of a preamble packet, a header packet, and a payload packet arranged in sequence. The preamble packet is used for measuring the frequency offset between the source of a wireless signal and the WAP 10, so as to realize frequency synchronization therebetween. The header packet contains parameters representing a current working status of the source of the wireless signal. The payload packet contains a main data that the wireless signal is transmitting. While the RF module 12 receiving the wireless signal, the preamble packet is first generated by the identifying module 14. In this case, the identifying module 14 identifies that the wireless signal received by the RF module 12 matches the frame format of the PCLP sub-layer of the IEEE 802.11 standards and generates a controlling signal. The controlling signal is then transmitted to the controlling module 16 by the identifying module 14. When identifying either that no wireless signal is received by the RF module 12 or that the wireless signal received by the RF module 12 can not be demodulated and packed to match the frame format of the PCLP sub-layer, the identifying module 14 does not generate the controlling signal.

The controlling module 16 is connected to the identifying module 14, and configured for controlling the WAP 10 to switch itself to a power-saving mode (PSM) or a constant awake mode (CAM), according to the result from the identifying module 14. In the PSM, under the control of the controlling module 16, the WAP 10 only receives the wireless signal. That is, other modules (not shown) of the WAP 10 which are not designated for receiving the wireless signal or not relate to the function of receiving the wireless signal are deactivated, thereby reducing the power consumption of the WAP 10.

Specifically, in the PSM, when no controlling signal incomes from the identifying module 14, the controlling module 16 controls the WAP 10 to maintain the PSM, otherwise, when the identifying module 14 generating the controlling signal, the controlling module 16 controls the WAP 10 to switch itself to the CAM, so that the WAP 10 could continuously receive the wireless signal that matching the IEEE 802.11 standards. In the CAM, when no signals income from the identifying module 14, the controlling module 16 controls the WAP 10 to switch itself to the PSM, otherwise, the controlling module 16 controls the WAP 10 to keep the CAM continuously receiving the wireless signal.

The WAP 10 of the present disclosure is provided with the PSM, in which the WAP 10 only receives the wireless signal and deactivates other modules irrelevant to the function of receiving the wireless signal. In operation, when other wireless devices, such as computers are required to connect to the Internet, they should send the wireless signal for requesting connection to the WAP 10, which could be received even when the WAP 10 is in the PSM. Therefore, the WAP 10 in the PSM ensures the wireless devices to connect to itself successfully. As a result, the WAP 10 with the PSM is able to reduce power consumption. Meanwhile, the PCLP sub-layer is the first sub-layer where data with a frame format is generated, which can be identified matching the IEEE 802.11 standards or not. Therefore, identifying the data in the PCLP sub-layer promotes the identifying efficiency and reduces arithmetic operations of the identifying module 14.

In alternative embodiments, the WAP 10 may further include a delay module 18, which is connected between the identifying module 14 and the controlling module 16. The delay module 18 is used to detect whether or not the identifying module 14 generates the controlling signal within a predetermined time. If not, under the control of the delay module 18, the controlling module 16 controls the WAP 10 to switch itself to the PSM, otherwise, the delay module 18 starts re-timing after detecting the controlling signal from the identifying module 14. Thus, the WAP 10 is avoided from changing working modes frequently.

Referring to FIG. 2, an exemplary embodiment of a method for saving power consumption of a WAP includes the following steps.

S1: setting a PSM and a CAM for a WAP. In the PSM, the WAP only receives wireless signal.

S2: determining whether the WAP receives a wireless signal that matches the frame format of the PCLP sub-layer of the IEEE 802.11 standards. If not, running to S3; if yes, running to S4. In detail, the wireless signal is about 2.4 GHz or about 5 GHz frequency. The WAP demodulates the wireless signal and packs the data contained in the wireless signal.

S3: the WAP switching itself into the PSM.

S4: the WAP switching itself into a CAM. If the data that has been modulated and packed includes a preamble packet which matches the frame format required by the PCLP sub-layer of the IEEE 802.11 standards, the WAP keep the CAM continuously receiving the wireless signal.

In alternative embodiments, before switching to the PSM, the method further includes S5: determining whether or not the WAP delays a predetermined time. If yes, running to S3; if not, going back to S2. In details, if the WAP does not receive the wireless signal that matches the frame format of the PCLP sub-layer of the IEEE 802.11 standards within the predetermined time, the WAP switch to the PSM.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A wireless access point (WAP), comprising:
   a radio frequency module, configured for receiving a wireless signal;
   an identifying module, configured for identifying whether or not the wireless signal matches a frame format of a physical layer convergence protocol (PCLP) sub-layer of the IEEE 802.11 standards, thereby generating an identifying result; and
   a controlling module, configured for controlling the WAP to switch to a power-saving mode (PSM) or a constantly awake mode (CAM), according to the identifying result from the identifying module;
   wherein when the radio frequency module receives the wireless signal, the identifying module demodulates the wireless signal and packs the data contained in the wireless signal, and generates a preamble packet that matches the IEEE 802.11 standards, then, the identifying module generates a controlling signal, the controlling module receives the controlling signal and controls the WAP to switch to the CAM;
   wherein the WAP further comprises a delay module, configured for determining whether or not the identifying module generates the controlling signal within a predetermined time, wherein if the delay module detects that the identifying module does not generate the controlling signal within the predetermined time, the controlling module controls the WAP to switch to the PSM, otherwise, the delay module starts re-timing after detecting the controlling signal from the identifying module.

2. The WAP of claim 1, wherein a frequency of the wireless signal is about 2.4 GHz or about 5 GHz.

3. The WAP of claim 1, wherein the identifying module is a chip having a baseband processor configured to process the data in a physical layer of the IEEE 802.11 standards.

4. The WAP of claim 1, wherein in the PSM, when no controlling signal incomes from the identifying module, the controlling module controls the WAP to maintain the PSM, otherwise, the controlling module controls the WAP to switch itself into the CAM; in the CAM, when no controlling signal incomes from the identifying module, the controlling module controls the WAP to switch itself into the PSM, otherwise the controlling module controls the WAP to keep the CAM.

5. A method for saving power consumption of a wireless access point (WAP), comprising:
   setting a PSM and a CAM for a WAP, wherein in the PSM, the WAP only receives wireless signal;
   determining whether the WAP receives a wireless signal that matches a frame format of the a physical layer convergence protocol (PCLP) sub-layer of the IEEE 802.11 standards; and
   switching the WAP to the PSM upon the condition that the WAP does not receive the wireless signal that matches the frame format of the PCLP sub-layer of the IEEE 802.11 standards in the a predetermined time;
   wherein before switching to the PSM, the method further determining whether or not the WAP delays a predetermined time if the WAP delays the predetermined time, the WAP switching itself into the PSM; if the WAP does not delay the predetermined time, further determining whether the WAP receives a wireless signal that matches the frame format of the PCLP sub-layer of the IEEE 802.11 standards.

6. The method of claim 5, wherein a frequency of the wireless signal is about 2.4 GHz or about 5 GHz.

7. The method of claim 5, wherein in determining whether the WAP receives the wireless signal that matches the frame format of the PCLP sub-layer of the IEEE 802.11 standards, the WAP modulates the wireless signal and packets the data contained in the wireless signal, when a preamble packet matching the frame format of the PCLP sub-layer of the IEEE 802.11 standards, the wireless signal is considered matching the frame format of the PCLP sub-layer of the IEEE 802.11 standards.

8. A wireless apparatus, comprising:
   a radio frequency module configured for receiving a wireless signal;
   an identifying module connected to the radio frequency module, the identifying module configured for generating a control signal upon determining that the wireless signal received by the radio frequency module matches a predetermined format;

a controlling module connected to the identifying module, the controlling module configured for controlling, upon receiving the control signal from the identifying module when the wireless apparatus is in a power-saving mode (PSM), the wireless apparatus to switch into a constantly awake mode (CAM); and a delay module configured for determining whether the identifying module generates the controlling signal within a predetermined time period when the wireless apparatus is in the CAM, if no control signal is generated within the predetermined time period, instructing the control module to control the wireless apparatus to switch to the PSM.

9. The wireless apparatus of claim 8, wherein the controlling module is further configured for controlling, upon receiving the control signal from the identifying module when the wireless apparatus being in the CAM, the wireless apparatus to maintain the CAM.

10. The wireless apparatus of claim 9, wherein the controlling module is further configured for controlling, when no control signal is received from the identifying mode and the wireless apparatus is in the PSM, the wireless apparatus to maintain the PSM.

11. The wireless apparatus of claim 10, wherein the controlling module is further configured for controlling, when no control signal is received from the identifying mode and the wireless apparatus is in the CAM, the wireless apparatus to switch itself into the PSM.

12. The wireless apparatus of claim 8, wherein when the wireless apparatus is in the PSM, a wireless signal receiving function of the wireless apparatus is activated while other functions irrelevant to wireless signal receiving are deactivated.

13. The wireless apparatus of claim 8, wherein the wireless apparatus is a wireless access point (WAP).

14. The wireless apparatus of claim 13, wherein the predetermined format is a frame format of a physical layer convergence protocol (PCLP) sub-layer as defined in IEEE 802.11 standards.

15. The wireless apparatus of claim 14, wherein the identifying module is further configured for demodulating the wireless signal, and encapsulating the demodulated wireless signal based on a PCLP sub-layer standard to form a data packet.

16. The wireless apparatus of claim 15, wherein the data packet comprises a preamble for frequency synchronization, a header for representing a current working state of a source of the wireless signal, and a payload for carrying data of the wireless signal.

* * * * *